Feb. 18, 1964     G. W. HARRIS, SR     3,121,627
METHOD OF PURIFYING WATER BY FREEZING
Filed July 24, 1961     2 Sheets-Sheet 1
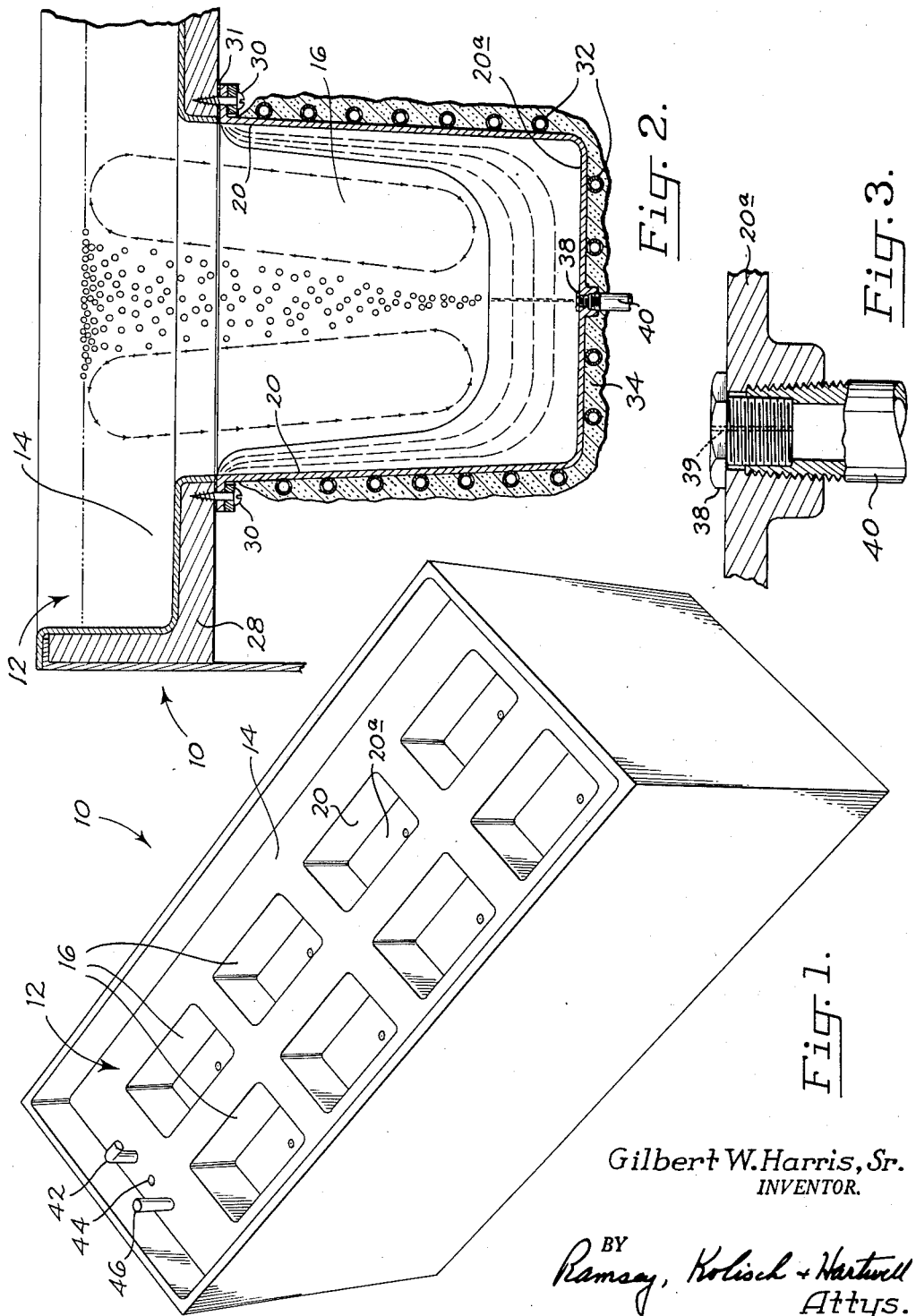
Gilbert W. Harris, Sr.
INVENTOR.
BY Ramsay, Kolisch + Hartwell
Attys.

Feb. 18, 1964  G. W. HARRIS, SR  3,121,627
METHOD OF PURIFYING WATER BY FREEZING
Filed July 24, 1961  2 Sheets—Sheet 2

Gilbert W. Harris, Sr.
INVENTOR.

BY Ramsey, Kolisch & Hartwell
Attys.

United States Patent Office 3,121,627
Patented Feb. 18, 1964

3,121,627
METHOD OF PURIFYING WATER BY FREEZING
Gilbert W. Harris, Sr., Portland, Oreg., assignor to Water Process Corporation, Portland, Oreg., a corporation of Oregon
Filed July 24, 1961, Ser. No. 126,116
3 Claims. (Cl. 62—58)

This invention relates to a method of abstracting ice or water from aqueous suspensions or solutions, and more particularly to a method of such abstraction that relies upon the crystallization of ice from solutions or suspensions under controlled conditions, whereby a relatively pure ice constituent is obtained. The invention has particular utility in connection with the making of pure ice (or water) from such solutions or suspensions as sea water, chlorinated water, contaminated water containing pathogenic organisms, and other aqueous mixtures containing solid or semisolid impurities.

Various water purification methods utilizing either vaporizing or freezing techniques have been practiced in the past. Because of the relatively low heat of fusion of water, compared to its heat of vaporization, there are inherent advantages to processes that rely upon freezing, rather than the volatilizing of water from a contaminated mass.

Theoretically a solution, such as an aqueous brine solution, should freeze at that temperature at which the solution and pure ice are in equilibrium, and on freezing of the solution pure ice should separate from the brine. Unfortunately, however, there has been evidenced a tendency during the freezing of such a solution for a salt concentrate to adhere on the surfaces of the ice crystals as they are formed, and on further crystallization of ice to be entrapped between the interfaces of the crystals, with the ice product resulting containing because of this entrapment a considerable amount of salt distributed therein even though the ice crystals themselves are pure ice. The mechanical entrapment of the impurity in the ice has detracted from the feasibility of purification by crystallization, because of the procedures and expense involved in inhibiting the entrapment in the first instance, or later removing the impurity.

Efforts to improve upon crystallization techniques have taken several forms. Some have suggested the preparation of a mass of crystals, and their detachment from the surface upon which they are formed to form a slush, with such crystals then subjected to a washing process, using either the mother liquid or fresh water. Because of the relatively small size of ice crystals, and the large surface area that must be washed in comparison with the mass of the crystals, the washing process has been difficult, and the recovery of pure ice has been relatively small in relation to the expense. Some of the problems attending the washing process may be alleviated by growth of larger crystals, but such necessitates special procedures. In addition to washing the crystals, others have suggested compressing the crystals, either using a press or by a centrifuge, whereby salt concentrate adhering to the crystal peripheries is squeezed from the total mass. If large enough pressures are used, there may be some melting of the crystals, with the water produced by melting aiding in the removal of impurity. From this discussion it may be seen that the problem of minimizing the effects of entrapment has assumed considerable importance.

A general object of the invention is to provide an improved method for crystallizing relatively pure ice from a mother liquid, effective to minimize the entrapment of nonwater constituents of the mother liquid on the surfaces of the forming ice crystals.

More specifically, it is an object of this invention to provide an improved method for separating by ice crystallization a relatively pure water constituent, that relies on the crystallizing of ice crystals in a freezing zone submerged in a pool of mother liquid, under such conditions and in such a manner that a gentle washing current passes through the crystals as they form, and the submerged ice crystals are shaped and oriented in a manner most effective in promoting washing of their surfaces by the washing current.

When water is frozen, ice crystals form that are acicular or needle-like in shape. With continued freezing, these crystals agglomerate into clusters or blocks. As contemplated by this invention, a cake of ice is formed, on a cold surface that is submerged in the solution or suspension treated, by progressively forming layers of such ice crystals on the submerged cold surface. The ice crystals apparently orient themselves in the direction of the temperature gradient producing their formation. According to this invention, the temperature of the cold surface is maintained, during the freezing of the crystals, substantially below the freezing point of the solution or suspension treated, and the treated solution or suspension is slowly circulated over the crystals as they form. The large temperature difference between the water to be frozen and the cold surface submerged therein results in the production of relatively long crystals, and these crystals form with their major dimension normal to the cold surface (aligned with the temperature gradient).

Circulated over and about the crystals and moving approximately normal to their length is the mother liquid, but the movement of the liquid is slow and does not disturb the orientation of the crystals. The circulating liquid washes off salt concentrate adhering to the crystals with the crystals oriented in a position promoting most effective washing. The result is an ice cake relatively free of impurity, and with the ice crystals forming the cake regularly oriented and distributed in regular courses throughout the ice cake.

In one embodiment of the invention, and as an object of the invention, a process is contemplated where the freezing of the solution or suspension is carried out in a container or receptacle having a bottom mold portion that constitutes a freezing zone, and superimposed thereover an upper tray portion that constitutes a nonfreezing zone, of larger expanse than the freezing zone. A body of liquid to be frozen is collected in such receptacle, and the walls of the mold portion defining the freezing zone is submerged in the liquid. The walls of the mold portion are cooled to below freezing temperature, and a propellant producing circulation of liquid in reverse flow against the walls of the mold portion is introduced, in the form of a stream of gas (air) bubbles passed upwardly through the middle of the freezing zone and thence through the nonfreezing zone. The air bubbles rise through the liquid, at a rate determined by their buoyancy in the liquid. A feature of the invention is that the stream of bubbles is controlled so as to produce a downward, returning reverse circulation of liquid into the mold portion along its sides and bottom, effective to produce washing of ice crystals without deorientation of the crystals. The rising stream of bubbles are also effective to carry upwardly and to discharge at the top of the nonfreezing zone solid and semisolid matter in the liquid.

Yet a further object of the invention is the provision of a novel method for leaching an ice cake with the removal of salt or other impurity residing in the cake. According to this concept of the invention, an ice cake is prepared in a manner such as to produce ice crystals in the cake that are regularly oriented and distributed in regular courses throughout the ice cake. The cake after freezing preferably is then "tempered," by letting it stand, at approximately the freezing temperature of the cake, to produce a cake of uniform temperature throughout. If the ice cake is subjected to a premelting process, with melting of a portion of the cake, elongated tubules are found to form throughout the cross section of the cake, with these substantially paralleling each other and extending in a uniform direction throughout the cake. Observations of the cake indicate that these tubules parallel the orientation of the needle-like crystals in the cake. During the premelting step, the water produced by melting runs through the cake with the selective removal at the same time of salt or other impurities lodged at the interfaces of the ice crystals therein. The leaching is the more effective by reason of the fact that the water flow parallels strata formed in the ice cake. Thus, according to this feature of the invention, a purified ice product is obtained by partial melting, or premelting, a specially prepared grained and stratified ice cake.

A further object of the invention is the provision of a process for making pure ice or water from contaminated water. It has been discovered that contaminated water containing pathogenic organisms, and water containing other suspended foreign matter, may be purified effectively by using the freezing technique indicated above. Apparently as the ice crystals form in the ice cake, and as mother liquid is circulated through the forming ice crystals, bacteria and other foreign matter are crowded to the surface of the crystals and removed by the current of mother liquid passing gently over the crystals. The impurities enter the bubble stream passing up through the freezing zone, and become entrained in the stream of bubbles whence they are carried upwardly to the overlying nonfreezing zone. Here the impurities apparently concentrate, and are held from re-entry into the mother liquid circulating downwardly into the freezing zone, probably because of surface tension effects. It has been observed, for instance, that with water containing solid and semisolid foreign matter, a frothy scum collects on the surface of the water in the nonfreezing zone. In the case of bacteria that do not tolerate oxygen, i.e., anaerobic bacteria, physical removal of bacteria is probably accompanied by some actual killing of the bacteria in the air stream. In the case of chlorinated water, the bubbling stream of air in the freezing and nonfreezing zones, in conjunction with the slow movement of mother liquid over the forming ice crystals to wash them, is effective to produce dechlorination.

Other objects and features are attained by the invention, and the same is described in the following description, to be read in conjunction with the accompanying drawings, in which:

FIG. 1 illustrates ice-making apparatus for crystallizing ice from solutions or suspensions, in the practice of the invention;

FIG. 2 illustrates portions of a liquid container in the ice-making apparatus of FIG. 1, on a somewhat larger scale, such container having an upper, tray portion, which constitutes a nonfreezing zone in the apparatus, and depending therefrom a mold portion, which constitutes a freezing zone;

FIG. 3 is an enlarged view of the air jet used for bubbling a stream of air into a liquid as ice crystallizes from the liquid;

Figure 6:
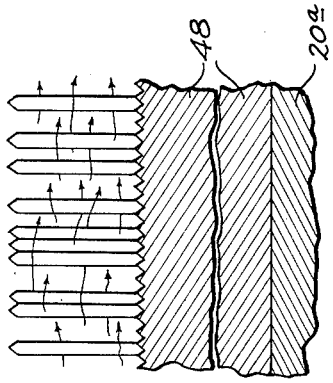
FIG. 6 is a view, greatly enlarged, illustrating the formation of a cake of ice, and showing how acicular ice crystals progressively form in layers and orient themselves in the direction of the temperature gradient.
Figure 5:
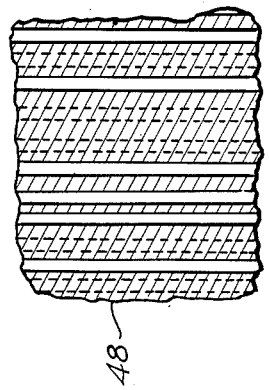
FIG. 5 illustrates portions of a cake of ice, after the premelting step contemplated by the process, with the portion of the ice cake drawn in an enlarged scale.

As indicated hereinabove, the process of the invention involves the freezing of a water mixture (such term, as used herein, includes either solutions or suspensions) on a submerged cold surface in a particular manner whereby ice crystals progressively form in layers on the surface to produce an ice cake. Apparatus in which such a process may be carried out is illustrated in FIGS. 1, 2, and 3.

Referring now to these figures, ice-making apparatus is shown including a cabinet 10, and mounted at the top of the cabinet a container or receptacle indicated generally at 12. Container 12 comprises an upper tray portion 14, and depending from tray portion 14 are plural mold portions or cavities 16. The side walls 20 of the molds are approximately vertical, although they slope outwardly slightly, diverging from the bottom to the top of the mold. Thus, each mold is without constriction between the bottom and top thereof. The molds also open to the bottom of tray portion 14, without a constriction between the top of a mold and the interior of the tray portion. The shape of the molds is important in promoting the desired circulation in the molds of the solution to be frozen, as defined more fully later herein. In the apparatus, the molds define freezing zones, and the tray portion 14 defines a nonfreezing zone, with such nonfreezing zone overlying and extending laterally beyond the sides of the freezing zones.

The side walls of each mold 16 are preferably metallic, as is floor 20a at the bottom of each mold, so as to effect good heat transfer. The walls of the tray portion may be metallic, but need not be, as preferably they need not effect good heat transfer. About the underside of tray portion 14 is a layer of insulating material 28. The molds are secured in place by fastening them to the base of the insulating material by screws 30. Around the top of each mold there may be provided an insulating ring 31.

Extending around the outside of the upstanding side walls of each mold, and under its base, is a system of coils 32. These may be used in both heating and cooling the side walls and floor of a mold. At 34 is indicated a mass of heat-conductive, mastic material, that aids in the transfer of heat between the surfaces of coils 32 and the walls and floor of a mold 20. During the freezing process, refrigerant is circulated through the coils to extract heat from a mold, with such reducing to subfreezing temperatures the inner surfaces of the walls and floor of a mold. When it is desired to loosen an ice cake, a warm fluid is circulated through the coils, to warm the mold walls and floor to above freezing temperature.

An inlet for the container in the apparatus, constituting the supply for liquid to be treated, is indicated at 42. A drain is shown at 44, and at 46 is indicated an overflow drain.

The refrigerating mechanism, controls, and other operating parts are housed within the base of cabinet 10. Apparatus similar to the one described is illustrated in my copending application entitled "Ice Making Apparatus," bearing Serial No. 831,270, filed August 3, 1959, now Patent No. 3,020,730, issued February 13, 1962, of which this application is a continuation-in-part.

At the base of a mold there is provided a plug 38 (see FIGS. 2 and 3), with a constricted passage 39 extending through the plug connecting the interior of the mold and the interior of an air supply a conduit 40 connected to the plug. Passage 39 limits the flow of gas (air) from conduit 40 into a mold, and ordinarily may have a diameter ranging from about 0.01" to 0.02".

Figure 7:
FIG. 7 is a flow diagram illustrating various steps in the process defined.

According to the method of this invention, a pure water product is obtained from a water solution or suspension through the steps preferably of first precooling the mixture, freezing the mixture under controlled conditions whereby a relative pure ice constituent is obtained, tempering the resulting ice product, subjecting the tempered iced to a premelting step where selective removal of any impurity takes place, and then melting the final ice to produce water. The entire process may be repeated if additional purity is necessary. The steps of the process are shown diagrammatically in FIG. 7.

Describing first the invention in connection with the desalination of sea water or brine, the solution preferably is first precooled, to a temperature approximating its freezing temperature, which is approximately 28.5° F. in the usual instance. The precise freezing temperature of sea water will, of course, vary somewhat, depending on its salinity. The precooled solution is then introduced into container 12, comprising the tray portion and molds 16, through inlet 42.

Preferably the solution level is adjusted so that there is in tray portion 14 approximately as much or more solution than that in the molds. Thus, there is an overbody of solution in the nonfreezing zone that is at least as much as the bodies of solution in the freezing zones. By providing the excess solution, a sharp increase in the concentration of impurity in the mother liquid during the freezing process is prevented. With molds 9″ deep and measuring at their tops 9″ by 12″, and where there is some 3″ separating adjacent molds, as illustrated, a level of solution in the tray portion some 2″ or 3″ deep will yield the overbody of solution desired.

After precooling and suitably filling container 12, refrigerant is introduced into coil system 32, and the sides and floors of the molds are cooled to subfreezing temperatures. According to the method of this invention, it is preferable to cool the walls and floor of a mold (their inner surfaces becoming submerged cold surfaces) to temperatures substantially below the freezing temperature of the solution, and with aqueous solutions such as sea water the preferred temperatures range downwardly from about 10° F. with optimum temperatures below about 5° F. A sharp temperature difference between a cold surface and the solution touching it evidently results in the formation of longer ice crystals, extending in a direction of the temperature gradient producing their formation, which is advantageous when these crystals are subjected to the washing action contemplated herein.

At or before the time that the freezing of the solution in the molds is started, streams of air are introduced through passages 39 into the molds, with such air bubbling upwardly through the solution in the interiors of the molds or freezing zones and the solution in the tray or nonfreezing zone. The amount of air introduced in a mold is controlled, so that bubbles produced by the air rise throughout substantially the entire distance up from the bottom of the mold at a rate determined by their buoyancy in the solution. Preferably the amount of air introduced is also controlled so that at the start of the freezing process the area occupied by the bubbles as they are dispersed at the top of a mold does not exceed about one-eight the area of the top of the mold itself. In the apparatus described, and with a diameter for passage 39 of .013″, air introduced to a mold and controlled in the manner indicated disperses in bubbles having approximately one-sixteenth inch diameters.

As the freezing process starts, and under the effects of the bubbling air streams described, the solution is caused to circulate slowly, with the air streams functioning as the propelling medium. The circulation of solution in a mold and directly above the mold is observed to be as shown by the arrows in FIG. 2, with solution centrally of a mold being propelled upwardly, and with a gentle, nonvigorous return circulation occurring downwardly along the sides and floor of a mold. This return circulation of solution appears quite slow moving, it being observed at the start of the freezing process to be about one-fourth or so the rate at which bubbles move upwardly, in a region some inch or so inwardly from the sides of a mold. As ice starts to form, web-like strands are noted that attach themselves to the walls of the mold, and these extend normal to the walls. A direction extending normal to the walls is the direction of the temperature gradient producing freezing, and thus the slow return circulation of water solution apparently has little disrupting effect upon the orientation of the forming ice crystals.

Figure 4:
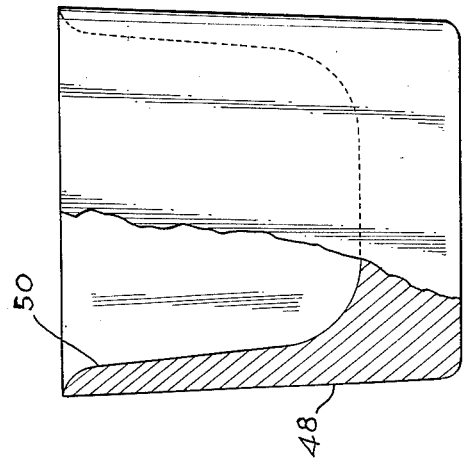
FIG. 4 illustrates an ice cake prepared in the apparatus of FIG. 1, according to the method of the invention.

On continued freezing, layers of ice crystals progressively form in each mold, building up, particularly at the base of a mold, with the formation of an ice cake 48 after an interval of freezing having substantially the cup shape illustrated in FIG. 4. The surface of the cavity 50 within the ice cake that forms is rough, and covered with projections or needle-like points extending perpendicularly to the surface, as can be determined by feeling the surface.

According to this invention, the freezing process preferably is stopped, after about one-fourth the volume of a mold cavity has been filled with ice, to yield the cake illustrated in FIG. 4. This is for the reason that the efficiency of heat transfer decreases as the ice layer increases, and freezing beyond this stage tends to be uneconomic. Freezing is also interrupted for the further reason that continued freezing reduces the freedom of movement of solution within the cavity formed centrally of the ice cake, which affects the recirculation of solution, and the orientation of the crystals, and the manner in which solution flows over them.

After an ice cake is formed, the ice cake is loosened from a mold by circulating a warm fluid through the coil system 32, to raise the temperature of the mold walls and floor above the freezing temperature. On loosening, a cake floats upwardly and into the body of water superimposed over the mold cavity.

The ice cake that results in the case of ice made from sea water, has been found to have a salt concentration substantially less than the salt concentration in the original sea water, in some locations as much as about 90% less salt. The salt concentration is considerably less than when conventional freezing techniques are employed. If a further reduction in the impurity thereof is desired, tempering and premelting steps may be employed, with selective removal of additional salt resulting.

An ice cake produced by the process has an interior temperature that is below the freezing point of the ice in the cake. To prepare the cake for premelting, the cake is first tempered, by allowing it to stand for a period at near freezing temperature. This enables the temperature of the ice in the entire cake to become uniform, at slightly below freezing temperature, without loss of exterior ice by melting. Tempering may be done at temperatures slightly above or slightly below freezing temperature.

Upon tempering the ice cake, and to further reduce the concentration of salt in the cake, the cake may be subjected to a premelting step, which produces a surprising result in a cake containing grained and stratified ice crystals as prepared by this invention. On the cake being allowed to stand for a period, at elevated temperatures, a multiplicity of apertures form in the cake that are substantially parallel to each other and are spaced equally from each other throughout the cross section of the ice in the cake. The apertures have small cross-sectional area, and, on further melting of the ice cake, become tubules having larger diameters (up to three-sixteenths of an inch) that extend vertically through the cake and approximately parallel with each other, with the cake resting on its base. Evidence indicates that the tubules extend in a direction paralleling the orientation of the ice crystals as they build up in the cake during its original formation. With premelting of the ice cake, the water produced by melting leaches the cake, and drains from the cake. Since the tubules and apertures apparently extend in the same direction as the ice crystals in the cake, drainage is along flow lines extending along the interfaces of the crystals. It has been observed that in a cake having a concentration of salt therein, the leaching of the cake that accompanies premelting is effective to remove salt selectively, to leave practically pure ice. Ordinarily the amount of ice melted in the premelting step is limited to about 20% of the original ice cake, leaching by further premelting producing insignificant reduction in salt concentration.

In the manufacture, for example, of potable water from sea water, heat exchangers may be employed in the premelting of the ice cakes, and in the melting of the premelted cakes to produce water. Heat abstracted from sea water to be processed may be employed to premelt and melt the ice cakes. This sea water, on having heat abstracted therefrom, is precooled and ready for freezing. If the concentration of salt in the water that is drained from the ice during the premelting step is less than the salt concentration in sea water, the drainage water may be used as part of the saline solution used in the freezing step. The drainage water from the premelting step is already in the usual instance substantially near freezing temperature, and therefore need not usually be precooled. If the drainage water has a higher salt concentration than sea water, it may be passed through a heat exchanger, and used in the precooling of sea water for processing.

The entire process of freezing and premelting, of course, may be repeated, in the event that even greater purity is desired.

In a particular freezing and premelting run carried out with sea water from the Pacific Ocean, the water was frozen in the molds of the apparatus, using a refrigerant at approximately —4° F., with such yielding a temperature for the cold surfaces of the molds of approximately 4° F. The salinity of the sea water, on a chloride basis, was 15,400 parts per million, and the freezing point of the water was approximately 29.5° F. Ice formed, as already indicated, with web-like strands first observed attaching themselves to the walls of the molds, and ice cakes then progressively building up in the mold cavities, having the shape illustrated.

During the process, air was bubbled, as described above, through the center of the freezing zones in the molds, and thence through the superimposed nonfreezing zone above them, with the bubbles of air breaking through the surface of the water and discharging air trapped therein into the atmosphere. As such air escaped into the atmosphere from the breaking bubbles, a strong, rather offensive odor was given off. Such apparently was because of the concentration of plankton, algae and other impurities entrained in the bubble streams that was carried upwardly and deposited on the surface of the overburden of sea water. Also observed during the formation of the ice was a frothy scum that collected on the top of the water in the apparatus, which tended to spread out, because of the bubble action in the apparatus, over the entire surface of the water in the nonfreezing zone.

On completion of the freezing process, clear cakes of ice were formed, apparently free of foreign particle matter. The salinity of the ice in a cake was tested, at the top, bottom, and side of the cake. The salinity at these locations was found to be 1,718, 3,820, and 4,150 parts per million, respectively.

An ice cake prepared as above was set on its base and subjected to premelting as described. Small apertures formed, extending vertically from top to bottom, and these eventually enlarge into elongated, vertically extending tubules (of about three-sixteenth inch diameter with melting of about 15% of the ice cake). Ice water flowed through these tubules and downwardly and apparently through interstices in the ice, and such water when tasted had a brackish taste. Water from the ice remainder when tasted, however, was potable.

Evidence of the grained, stratified character of the ice, and the orientation of the crystals therein, was obtained by shattering the premelted ice cake by dropping it on a concrete slab. The ice immediately broke into elongated, pencil-like fragments, and shorter pieces, with the lateral dimensions of the fragments and pieces being the spacing between the tubules.

A similar type of freezing process was carried out, using city tap water, which is a chlorinated run-off product of a water shed area. Ice cakes resulted, which, when premelted in the manner indicated above, exhibited a similar grained and stratified structure. Thus, again tubules formed between top and bottom of the cake, and these were regularly distributed throughout the cross section of the cake. Water resulting from melting a frozen cake was tested, and found to be pure.

In another instance, turbid river water having a high bacteria count was frozen using the process described. As in the case when sea water was frozen, a stench evolved when bubbles passing through the forming ice cakes emerged from the top of the overburden of water in the apparatus and burst open. A frothy scum also collected on the top of the overburden. The ice that resulted was clear, with no evidence of contamination.

It will be seen from the above that a process is contemplated which enables the abstraction of ice or water from water solutions or suspensions whereby during the freezing proces a relatively pure ice constituent is obtained directly, and without washing, crushing, or pressing of the ice product. As also indicated above, an ice product is obtained, which, because of the unique conditions employed during the formation of the ice, has a definite grained and stratified character. This peculiar structure of the ice product accommodates a unique type of leaching of the ice, through the expedient of subjecting the ice to a premelting stage or step, wherein portions of the ice are melted, and the water resulting from the melting runs out of the ice in paths having a definite relation to the stratified and grained structure of the ice, and with selective removal of any impurity in the ice cake without disproportionate loss of the ice product.

I claim:

1. In the purification of water, the process comprising collecting a body of water in a receptacle having a freezing and a nonfreezing zone, respectively, with said freezing zone bounded by a heat-conductive surface and said nonfreezing zone superimposed over and extending laterally of the sides of said freezing zone, directing a stream of gas up through said freezing and nonfreezing zones from a point located at the base of the freezing zone and inwardly from the sides thereof with the gas bubbling through the water and operating to propel portions of the water upwardly along the center of the freezing zone, producing a gentle downward and return circulation of water on the sides and inwardly along the base of said freezing zone by replacing the portions of water propelled upwardly with portions of the water in the nonfreezing zone drawn down the sides of the freezing zone, controlling the flow of gas through said freezing zone so that bubbles resulting from the gas rise under their own buoyancy and disperse at the top of the freezing zone in an area not exceeding about one-eighth the area of the top of the freezing zone, and maintaining the surface bounding the freezing zone below about 10° F. whereby ice crystals form on the surface and these collect progressively to form an ice cake, the sharp temperature difference between said surface and the water and the gentle return circulation of the water over the ice crystals resulting in the formation of elongated acicular ice crystals oriented with the crystals approximately normal to said surface.

2. The process of claim 1 wherein the production of the ice cake is continued until the ice cake has attained a volume of not more than about one-fourth the volume of said freezing zone, and then it is terminated.

3. The process of desalinating sea water, comprising collecting a body of sea water in a receptacle having a freezing and a nonfreezing zone, respectively, with said freezing zone bounded by a heat-conductive surface without constriction between the bottom and top and said nonfreezing zone superimposed over and extending laterally of the sides of said freezing zone, directing a stream of air through said freezing and nonfreezing zones form a point located at the base of the freezing zone inwardly from the sides thereof with the air bubbling up through the sea water and operating to propel portions of the water upwardly along the center of the freezing zone, producing a gentle downward and return circulation of water along the sides and inwardly along the base of said freezing zone by replacing the portions of water propelled upwardly with portions of the water in the nonfreezing done drawn down the sides of the freezing zone, controlling the flow of air through the freezing zone so that bubbles resulting from the air stream rise under their own buoyancy and disperse at the top of the freezing zone in an area not exceeding about one-eighth the area of the top of the freezing zone, and maintaining the surface bounding the freezing zone at a temperature below about 10° F. whereby sea water in the zone freezes on said surface with the production of ice crystals and these ice crystals collect progressively to form an ice cake, the sharp temperature difference between said surfaces and the sea water and the gentle return circulation of the water over the ice crystals resulting in the formation of elongated acicular ice crystals oriented with the crystals approximately normal to said surface.

References Cited in the file of this patent

UNITED STATES PATENTS

| | | |
|---|---|---|
| 959,697 | Beals | May 31, 1910 |
| 1,180,533 | Pownall | Apr. 25, 1916 |
| 1,464,433 | Lindsay | Aug. 7, 1923 |
| 2,221,212 | Wussow et al. | Nov. 12, 1940 |
| 2,291,826 | Muffly | Aug. 4, 1942 |
| 2,601,324 | Ribeiro | June 24, 1952 |